US007387721B2

(12) United States Patent  (10) Patent No.: US 7,387,721 B2
Moore  (45) Date of Patent: Jun. 17, 2008

(54) APPARATUS AND SYSTEM FOR REMOVING SCALE CAUSING CHEMICALS IN HOT WATER SYSTEMS

(75) Inventor: Steven Clay Moore, 8211 Long Canyon Dr., Austin, TX (US) 78732

(73) Assignee: Steven Clay Moore, Austin, TX (US)

( * ) Notice: Subject to any disclaimer, the term of this patent is extended or adjusted under 35 U.S.C. 154(b) by 0 days.

(21) Appl. No.: 11/251,027

(22) Filed: Oct. 14, 2005

(65) Prior Publication Data

US 2006/0032802 A1  Feb. 16, 2006

Related U.S. Application Data

(62) Division of application No. 10/449,509, filed on Jun. 2, 2003, now Pat. No. 7,001,524.

(51) Int. Cl.
C02F 1/02 (2006.01)

(52) U.S. Cl. .............. 210/95; 122/13.01; 122/14.1; 122/19.1; 210/167.31; 210/167.32; 210/175; 210/181; 210/195.1; 210/253

(58) Field of Classification Search ........... 210/175; 126/361.1
See application file for complete search history.

(56) References Cited

U.S. PATENT DOCUMENTS

| | | | | | |
|---|---|---|---|---|---|
| 1,737,202 | A | * | 11/1929 | Runnels | 122/14.22 |
| 2,861,689 | A | * | 11/1958 | Lyall | 210/175 |
| 3,461,854 | A | * | 8/1969 | Henry et al. | 122/14.22 |
| 3,606,017 | A | * | 9/1971 | Moore | 210/181 |
| 3,692,179 | A | * | 9/1972 | Moore | 210/94 |
| 4,347,133 | A | * | 8/1982 | Brigante | 210/138 |
| 4,535,931 | A | * | 8/1985 | Bartok et al. | 236/20 R |
| 4,550,710 | A | * | 11/1985 | McDonald, II | 122/13.01 |
| 4,606,823 | A | * | 8/1986 | Lucas, III | 210/282 |
| 4,652,379 | A | * | 3/1987 | Nyberg | 210/717 |
| 4,790,289 | A | * | 12/1988 | Barrett | 122/17.1 |
| 4,948,499 | A | | 8/1990 | Peranio | |
| 4,957,200 | A | | 9/1990 | Turner et al. | |
| 4,957,624 | A | | 9/1990 | Peranio | |
| 4,983,193 | A | * | 1/1991 | Tani et al. | 55/487 |
| 5,017,284 | A | | 5/1991 | Miler et al. | |
| 5,160,444 | A | | 11/1992 | McFarland | |
| 5,215,655 | A | | 6/1993 | Mittermaier | |
| 5,254,243 | A | | 10/1993 | Carr et al. | |
| 5,256,279 | A | | 10/1993 | Voznick et al. | |
| 5,443,739 | A | | 8/1995 | Vogel et al. | |
| 5,472,622 | A | | 12/1995 | Solomon et al. | |
| 5,587,055 | A | | 12/1996 | Hartman et al. | |

(Continued)

*Primary Examiner*—Peter A. Hruskoci
(74) *Attorney, Agent, or Firm*—Jeffrey S. Schubert; Schubert Osterrieder & Nickelson PLLC (57) ABSTRACT

Hot water pipes, in areas with hard water, tend to fill with scale until they no longer pass enough water. De-scaling water pipes with acid is dangerous, expensive and damages the pipes. Ion exchange and reverse osmosis water softeners eliminate scale buildup in pipes, but are expensive. This invention is a means of keeping the scale precipitate, created when water is heated, inside the water heater by passing the hot water through a removal medium where the scale sticks to the surface. The removal medium can be placed inside the water heater or in a separate tank connected to the water heater; both configurations remove the precipitate from hot water; both save hot water pipes from scale accumulation.

20 Claims, 7 Drawing Sheets

U.S. PATENT DOCUMENTS

| | | |
|---|---|---|
| 5,647,269 A | 7/1997 | Miller et al. |
| 5,679,243 A | 10/1997 | Cho |
| 5,755,957 A | 5/1998 | Jeon |
| 5,776,333 A | 7/1998 | Plester et al. |
| 5,795,996 A * | 8/1998 | Chang et al. ............... 73/61.41 |
| 5,837,147 A | 11/1998 | Joung |
| 5,858,248 A | 1/1999 | Plester et al. |
| 6,009,585 A * | 1/2000 | Middleton ..................... 8/158 |
| 6,416,673 B2 | 7/2002 | Plester et al. |

* cited by examiner

APPARATUS AND SYSTEM FOR REMOVING SCALE CAUSING CHEMICALS IN HOT WATER SYSTEMS

CROSS-REFERENCE TO RELATED APPLICATION

Pursuant to 35 USC § 121, this divisional application claims priority to and benefit of U.S. Utility patent application Ser. No. 10/449,509, filed Jun. 2, 2003, now U.S. Pat. No. 7,001,524 on behalf of inventor Steven Clay Moore, entitled "METHOD FOR REMOVING SCALE CAUSING CHEMICALS IN HOT WATER SYSTEMS".

FIELD OF INVENTION

The invention relates to a water treatment system to remove scale from domestic or commercial hot water.

BACKGROUND

In some places the water supply has so much calcium and other dissolved minerals that when the water is heated, solid precipitates form and accumulate as scale inside the water heater and hot water pipes. Scale accumulation inside the water heater typically reduces the life of large tanks, such as used by office buildings and apartment buildings with central hot water systems, from 5-8 years to 2-5 years. Domestically, scale buildup is not as much of a concern; household water heaters and pipes last 10-20 years before scale becomes a problem, even when the water supply is very hard. However, many households still purchase water softeners. In areas where the water supply is hard, apartment complexes with central hot water supplies need to de-scale the hot water pipes about once every 6 years, costing up to $30,000 depending on the amount of damage to the pipes. Typically, iron pipes can be de-scaled about three times before they must be replaced.

A secondary problem is scale buildup in the water heater. One water heater manufacturer offers a "turbo" model which uses small orifices on the input pipe to create turbulence inside the tank. The concept is to flush out scale buildup with the turbulence. Unfortunately, it is cheaper to keep the scale in the water heater; a commercial size domestic water heater costs about $3,000 (including labor) to replace, while de-scaling the pipes is much more expensive.

Current water treatment methods are too effective and too costly for applications where the objective is reducing scale buildup in the water heater and hot water pipes. Ion exchange water softening systems, such as supplied by Culligan, are both expensive and costly to maintain. These systems require regular maintenance and when used to treat large quantities of water the upkeep makes them economically unfeasible.

Another treatment technique is reverse osmosis. Reverse osmosis systems can treat large quantities of water, as in semiconductor factories, and purify water through a reverse osmotic membrane. In addition to filtering out the carbonates that cause scale, these systems also remove heavy metals and biological contaminants. Reverse osmosis systems are more expensive than ion exchange systems and are directed towards improving water quality rather than only removing the chemicals that become scale. Both ion exchange and reverse osmosis systems remove scale, but at a cost where it is cheaper for office buildings and apartment complexes to de-scale and replace hot water pipes than purchase and maintain a water softener.

U.S. Pat. No. 6,416,673 and others, by Plester, and assigned to The Coca Cola Company, describe a filtering system consisting of a heater, filter and cooler; implemented to treat water for a soft drink dispenser. Plester's preferred method of removing scale from hot water is a filter made of polyester fiber mesh. Plester's patent differs from this invention in that the application is specifically for filtering water for a soft drink dispenser; a low volume application requiring a high removal efficiency. By comparison, this invention is for domestic or commercial hot water supplies with 10 to 10,000 times more volume, is less efficient, and uses granules or loose mesh material rather than a filter to remove the precipitate. There is no interest in improving taste, removing gasses, or sterilization as is desired for the Coca Cola application.

Other patents discovered in a patent search cover hot water tanks, heaters, valves, filters, additives, hardness sensors, control circuits, ionic exchange softeners, reverse osmosis, and stills. None of these devices are the same as this invention.

BRIEF SUMMARY OF THE INVENTION

It is specifically because the precipitates adhere together to form a solid that they are a problem and cause scale. Thus, all that is necessary to remove the precipitates is giving them ample opportunity to adhere somewhere harmless before traveling down the hot water pipes. For low volume applications, a filter would work, but it will clog in a domestic or commercial hot water application. This invention provides adequate scale removal for domestic or commercial hot water applications by spreading the water flow over a large area, allowing it to pass slowly through many small passages where there is ample time for the precipitate particles to come into contact and adhere to a surface. As a result of the large number of passageways, there is minimal flow restriction.

Additionally, as scale accumulates on the surfaces, there needs to be a means for the filtration area to accommodate the scale buildup without further restricting flow. A large surface containing area, such as a pile of gravel or man made media with loose mesh, such as spun glass, has enough open space to accommodate a lot of scale accumulation before restricting flow. Also, the flowing water can push loose granules and increase their separation as gaps between granules fill with scale buildup.

This invention is to place granules, or other material, as a layer inside water heater tanks, or in a separate tank. Providing a place inside the water heater tank for the removal medium would be part of the manufacturing process. The separate tank configuration has the advantage of being less costly to replace or rejuvenate, but it has the disadvantage of requiring extra space, which may not be available in existing boiler rooms, as well as extra installation costs.

Though the drawings show water heaters in the shape of a tank, this invention works with water heaters that do not use a tank. However, most domestic hot water applications use tank water heaters because they store a reserve of heated water to meet the demand during morning and evening hours. As a result, this invention allows, by means of a circulation pump, the water in the tank to become purer because the tank water is circulated up to 1,000 times through the removal medium during off peak time.

BRIEF DESCRIPTION OF THE DRAWINGS

The items in the drawings are labeled as follows:
HWH is the water heater;
P is the pump that circulates the hot water;
T is the tank containing the removal medium for the scale to deposit onto; and TA is the area inside the hot water heater containing the removal medium for the scale to deposit onto.

The solid black lines with arrows in the drawings signify water pipes.

Valves, pipe joints, emergency relief valves and other devices not specifically part of this invention, but commonly used in such plumbing applications are not shown.

DETAILED DESCRIPTION OF THE INVENTION

For this invention, the removal medium is a bed of granules or loose mesh material, such as spun glass as long as the surface area of the bed of granules or loose mesh material is larger than that of the tank they are housed in. The granules can be metal, plastic, glass, or any other material. The height of the bed of granules or loose mesh material is also variable, the only restrictions being the amount of space in the tank where the removal medium is stored and how much scale the bed can accumulate before restricting flow. The bed can be held in place by screens, perforated plates or plates made of any material.

Secondly, whether inside a water heater or housed in a separate tank, the tank holding the removal medium needs an opening to load, remove, or replace granules or loose mesh material.

In addition, the tank holding the removal medium should have a window allowing inspection of the granules or loose mesh material without opening the tank. The surrounding pipes should also have a port to monitor scale buildup while the system is running.

Figure 1:
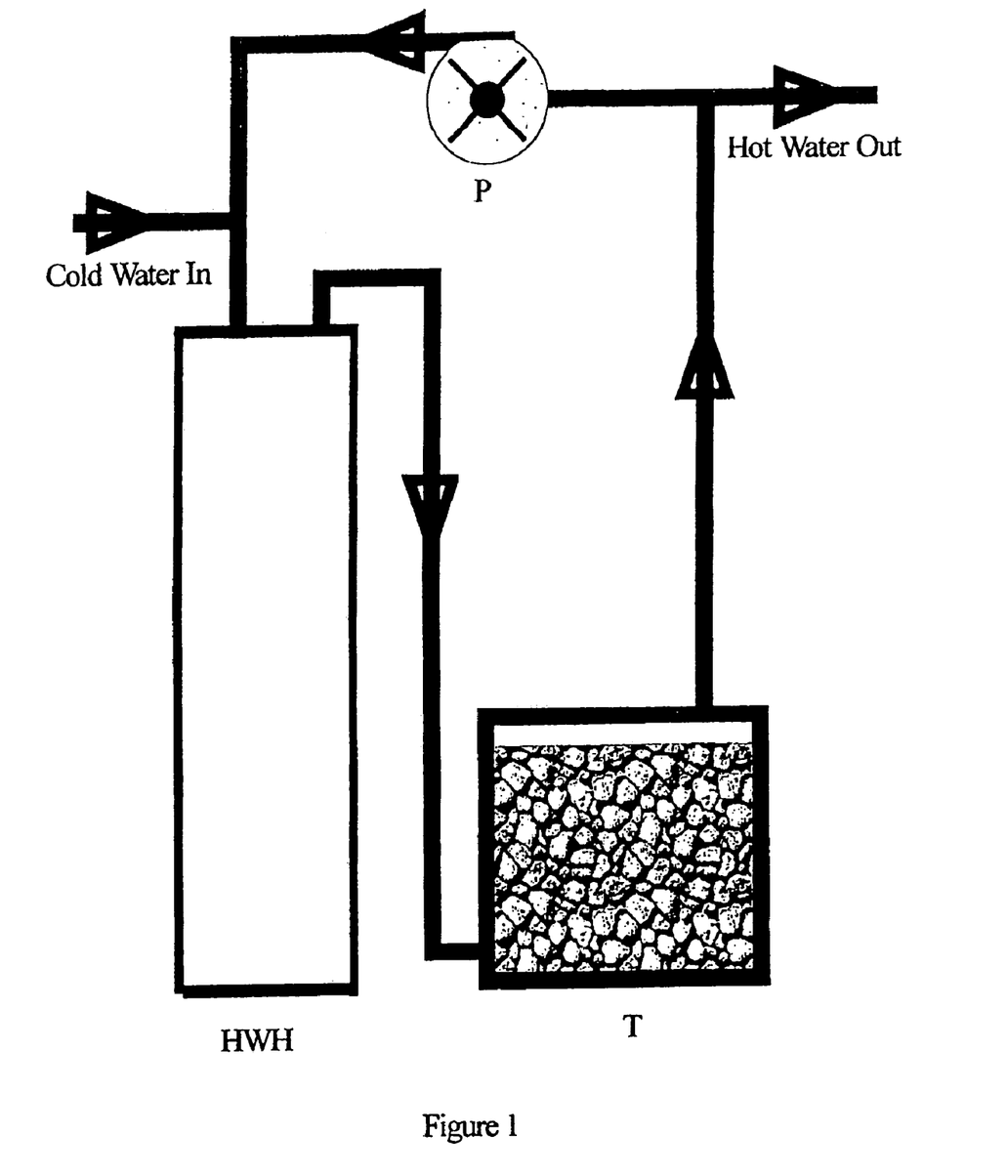
FIG. 1 shows the preferred embodiment; a standard home or commercial size hot water heater, followed by a separate tank, which holds the removal medium for the scale to deposit onto, and a pump to circulate the water.

Of the diagrams, FIG. 1 is the preferred embodiment. The cold water (Cold Water In) joins the circulated hot water and enters the water heater (HWH). The water is then heated and fed into the tank containing the removal medium (T). Within the tank, the water spreads over a bed of granules or loose mesh material, passing through the volume and depositing the precipitates on the removal medium. The treated water is then split at a junction where one pipe supplies the hot water pipes (Hot Water Out) and the other is fed back into the water heater (HWH) by means of a circulation pump (P).

Figure 2:
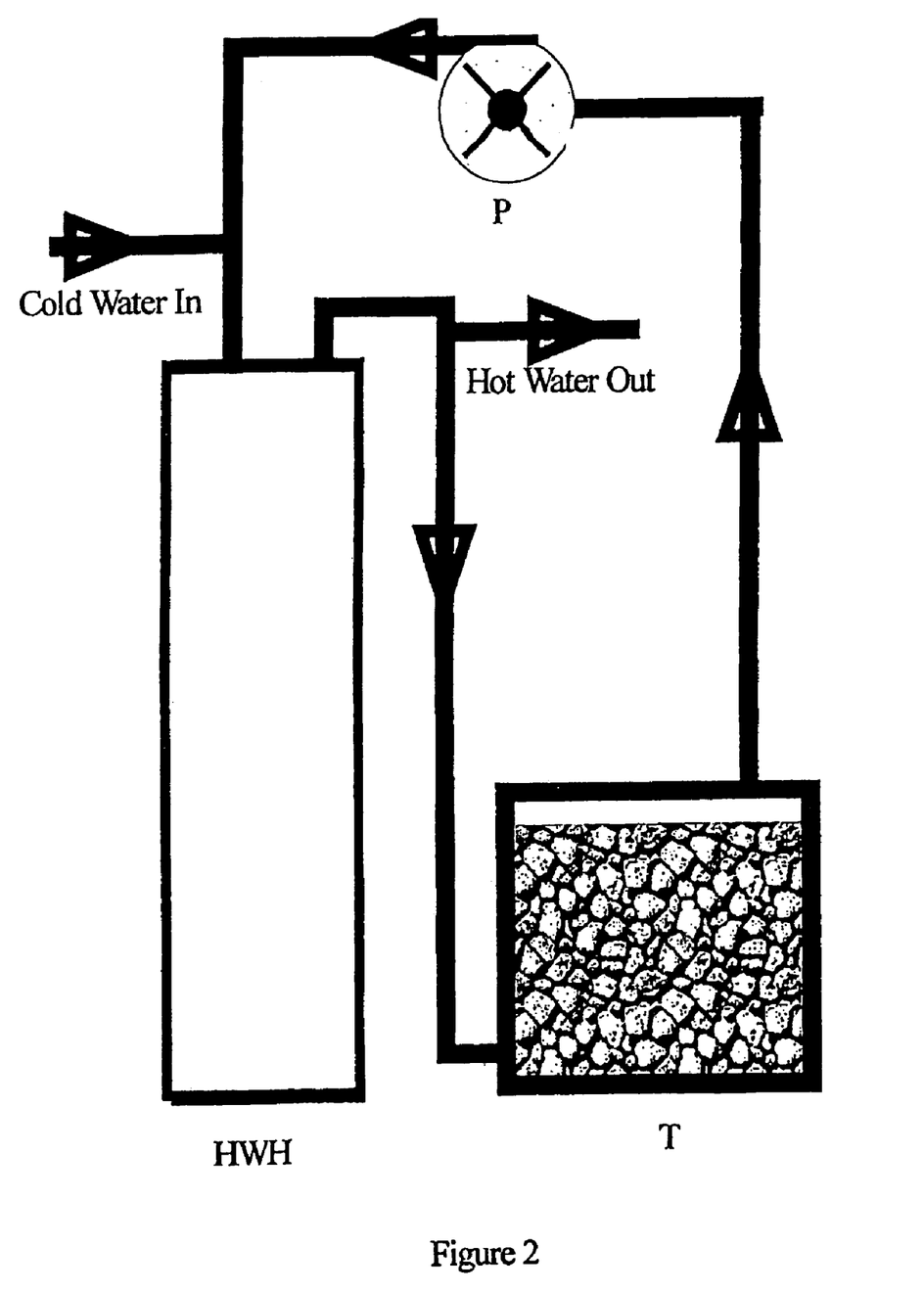
FIG. 2 is the same as FIG. 1 except the hot water departs at a different point.

FIG. 2 is a similar implementation, except the output to the hot water pipes (Hot Water Out) is taken from a junction at the output of the water heater (HWH). There is still a feedback loop as the other pipe enters the tank housing the removal medium (T) and all of the water exiting the tank is circulated by the pump (P) into the water heater (HWH).

Figure 3:
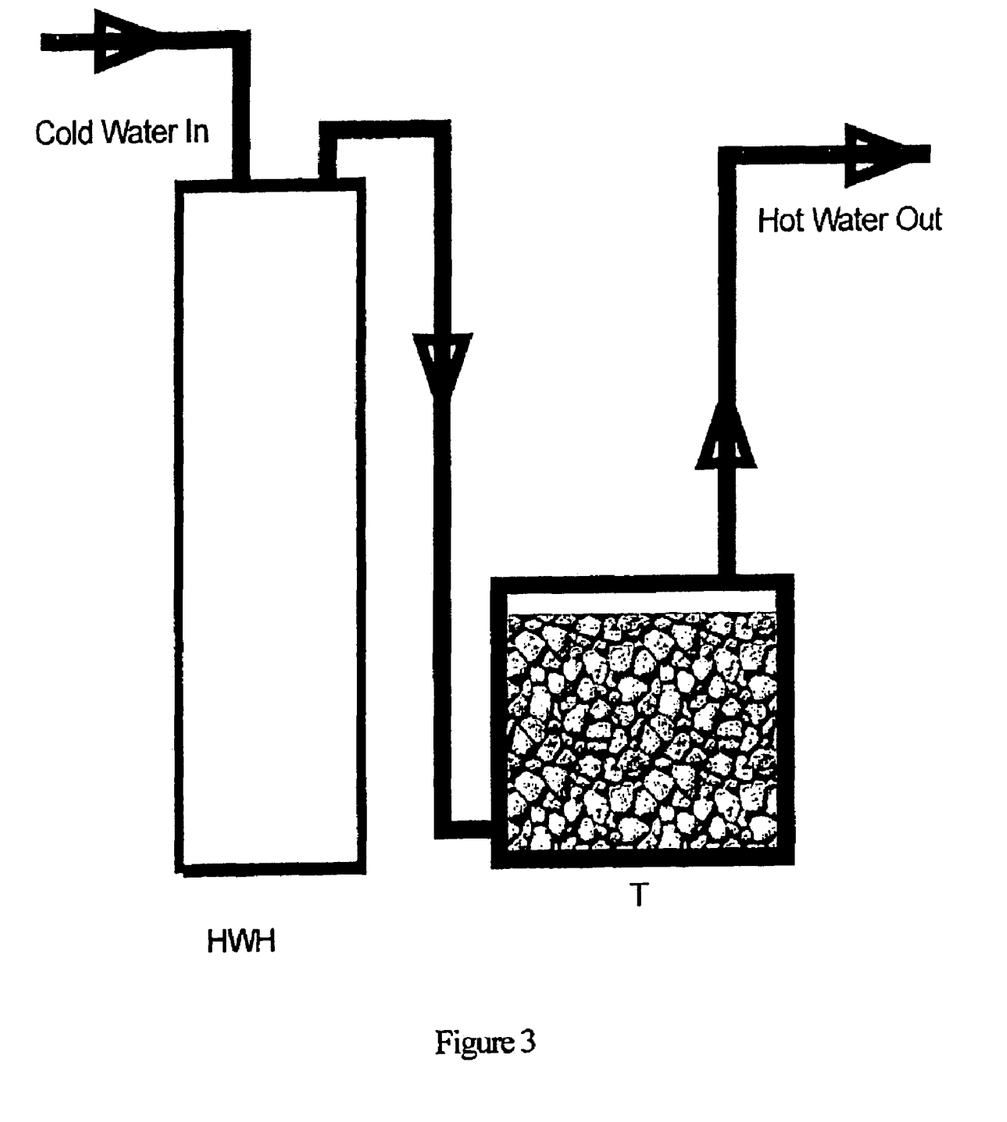
FIG. 3 depicts FIG. 1 without circulation.

In FIG. 3, the water heater (HWH) and the tank holding the removal medium (T) are cascaded. The cold water (Cold Water In) enters the water heater (HWH) and the output pipe of the water heater is connected to the tank containing the removal medium (T). The hot water pipes (Hot Water Out) are fed by output of the tank (T). There is no loop to circulate the water.

Figure 4:
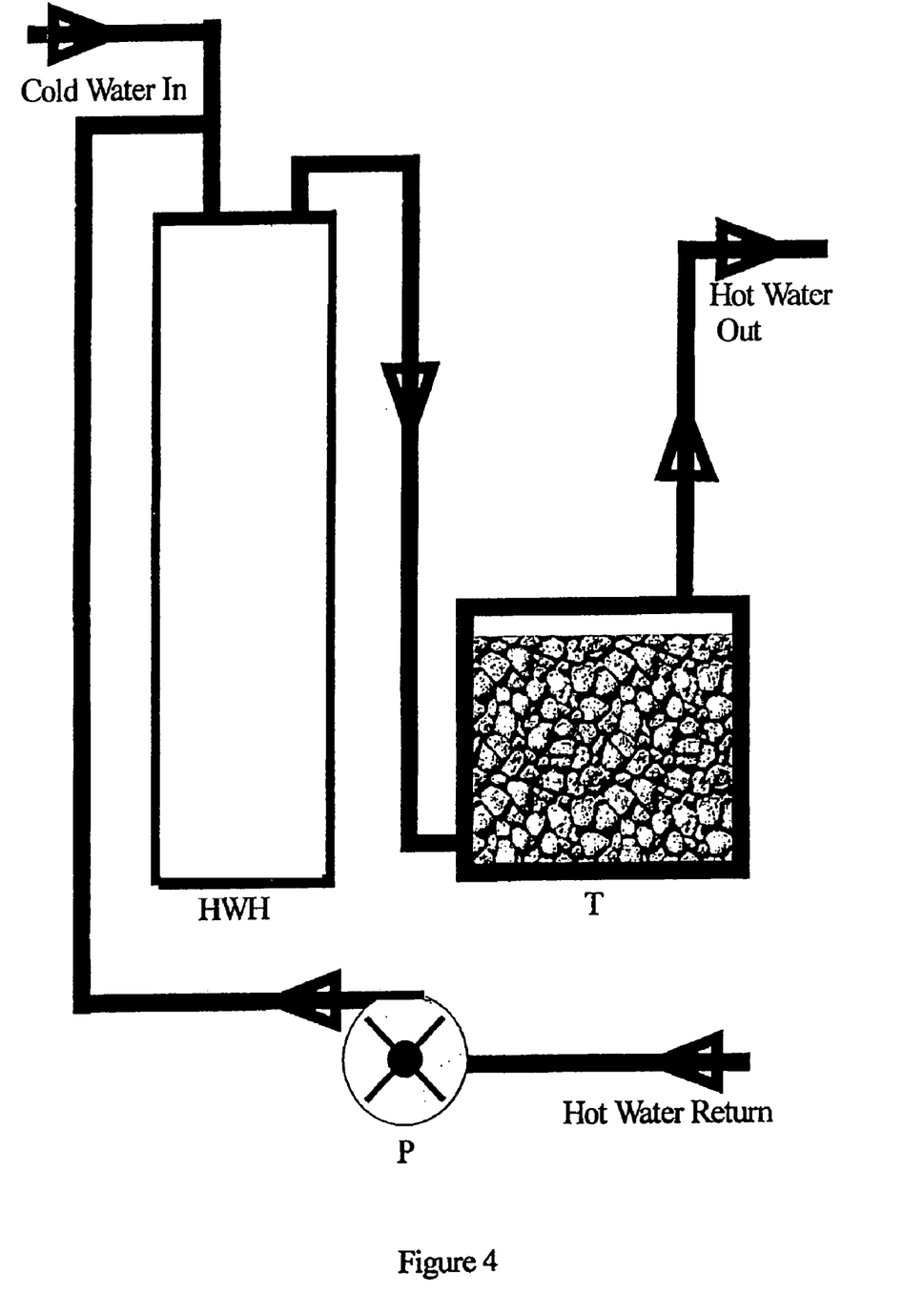
FIG. 4 is the same as FIG. 1 except the water circulates through the hot water return pipe, which is common to many central hot water systems.

FIG. 4 is similar to FIG. 3 except there is a feedback loop. The hot water returning from the hot water pipes (Hot Water Return) is fed into the water heater (HWH) along with the cold water (Cold Water In). The heated water then goes through the tank holding the removal medium (T) to the hot water pipes (Hot Water Out).

Figure 5:
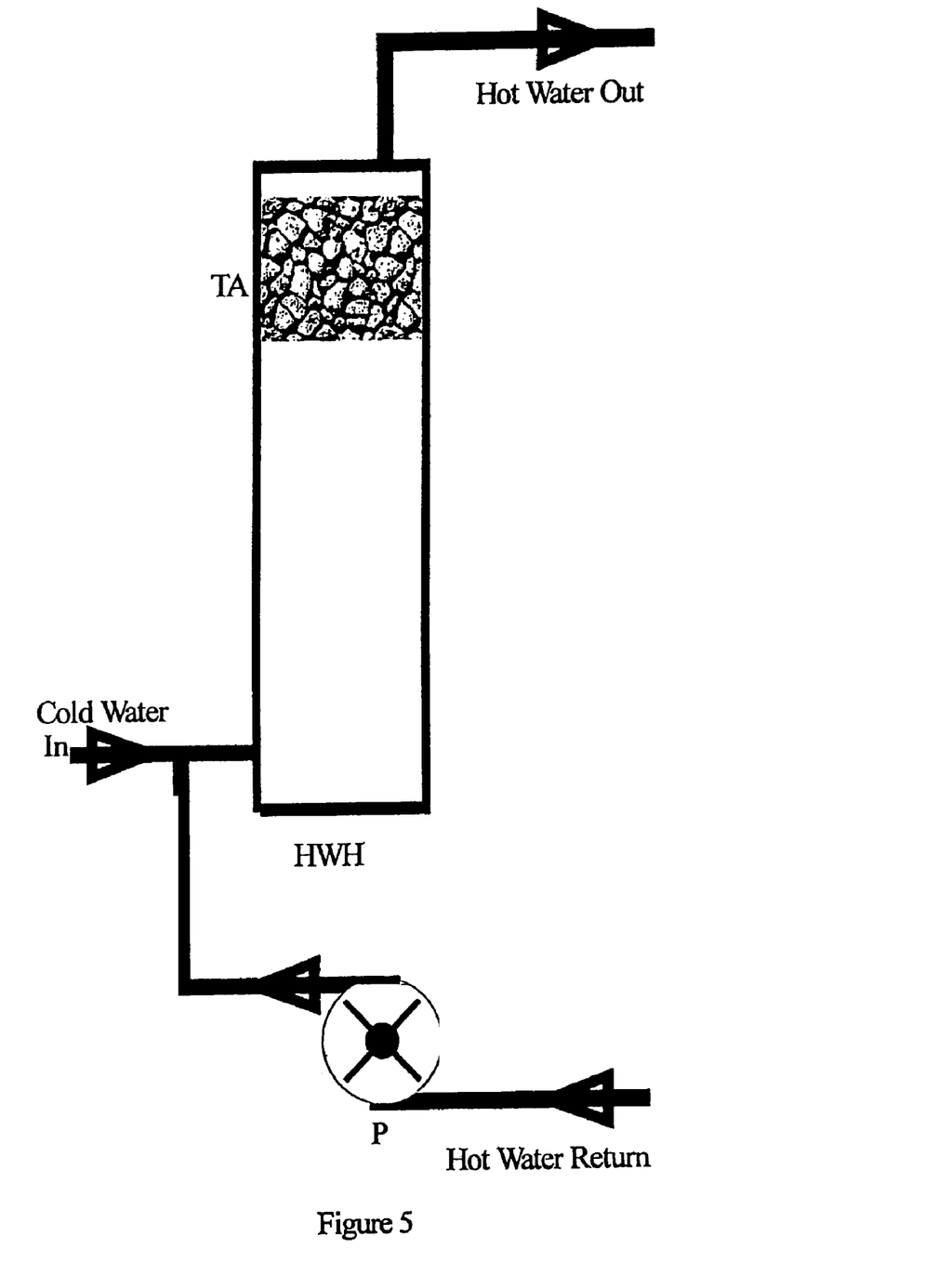
FIG. 5 is the same as FIG. 4 except the removal medium is inside the hot water tank.
Figure 6:
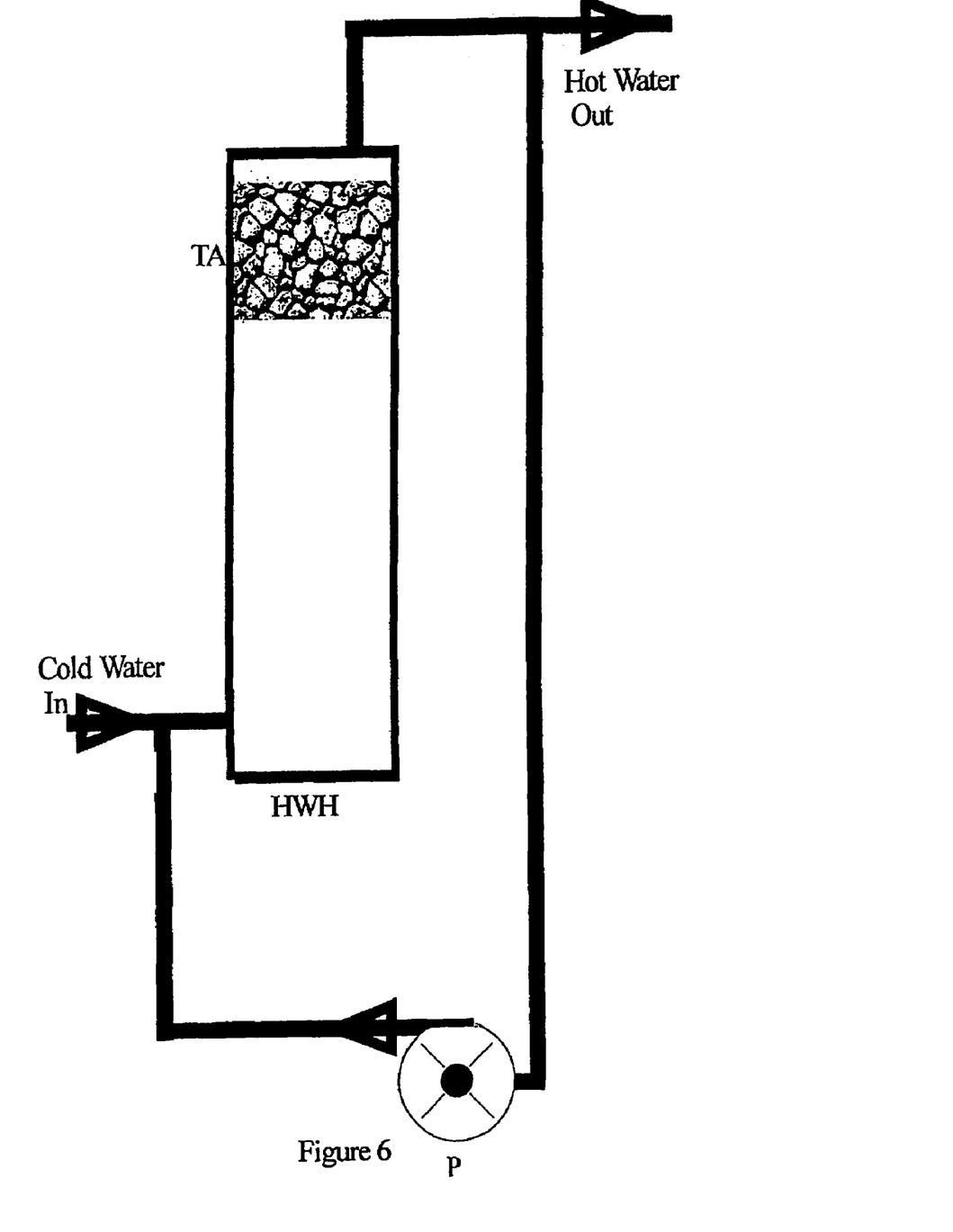
FIG. 6 is the same as FIG. 1 except the removal medium is inside the hot water tank.

FIG. 5 and FIG. 6 show configurations where the removal medium (TA) is stored inside the water heater (HWH). In FIG. 5, the hot water returning from the hot water pipes (Hot Water Return) enters the water heater (HWH) along with the cold water (Cold Water In). The water is then heated by the water heater (HWH) and flows through the removal medium inside the water heater (TA), removing the precipitate. The hot water pipes (Hot Water Out) are fed by the output of the water heater (HWH).

FIG. 6 is the same as FIG. 5 except a circulating pump (P) feeds the circulated water into the water heater (HWH) instead of the returning hot water. First, the cold water (Cold Water In) and circulated water enter the water heater (HWH). The water is then heated and flows through the removal medium (TA). The output of the water heater goes to a junction where one pipe feeds the hot water pipes (Hot Water Out) and the other is fed to the water heater (HWH) by means of a circulating pump (P).

Figure 7:
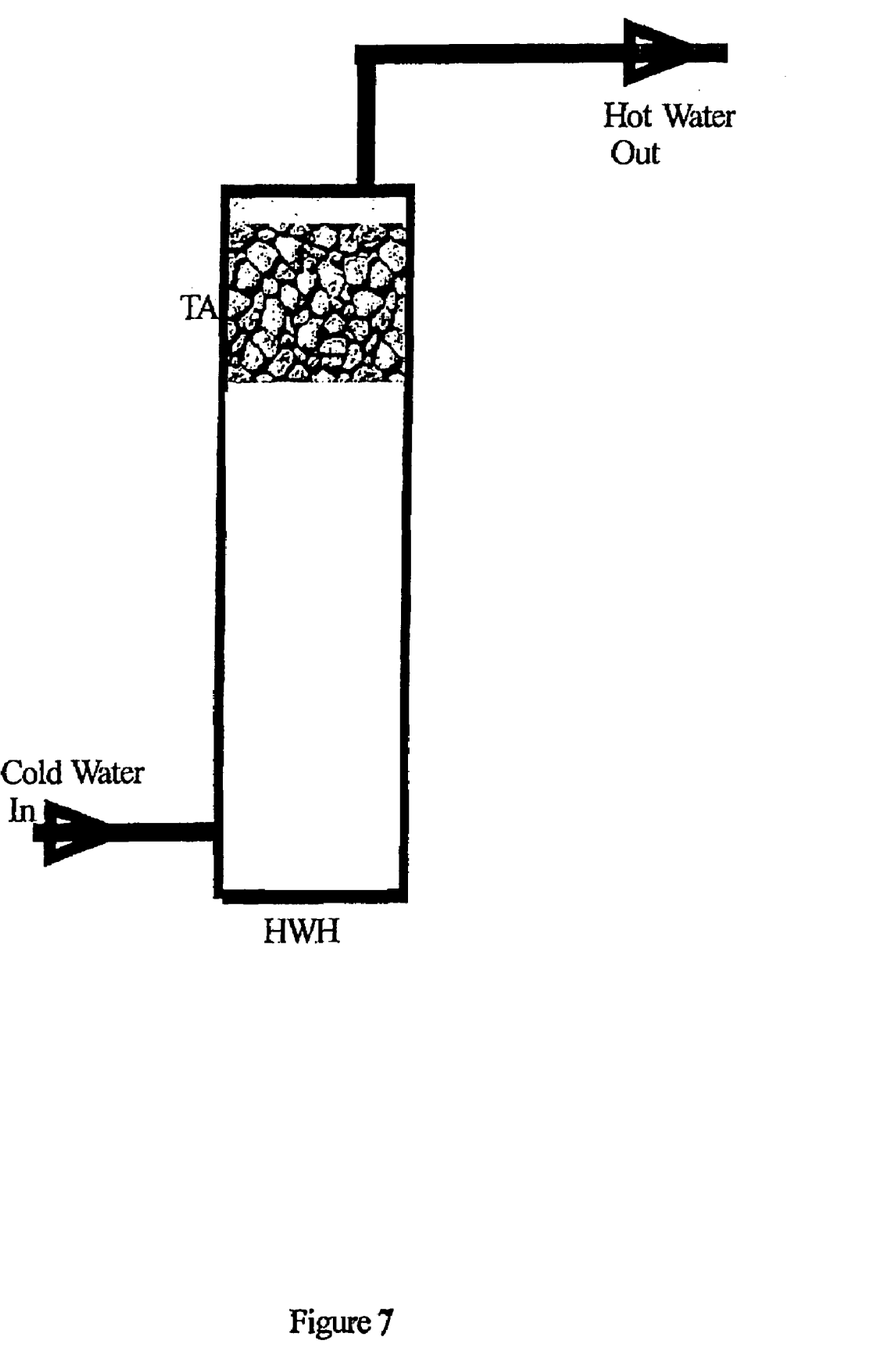
FIG. 7 shows the removal medium inside the hot water tank without circulation.

FIG. 7 is similar to FIG. 6 except that there is no circulation. The cold water (Cold Water In) enters the water heater (HWH), goes through the removal medium (TA) and feeds the hot water pipes (Hot Water Pipes).

In addition to the above-mentioned figures, one can use multiple tanks, water heaters, pumps and insulated pipes and valves to augment the above systems. Secondly, one can use valves before and after pumps, pipes and tanks to switch between in-use and offline units.

The water heater should heat the incoming cold water to between 50 and 110 degrees C. The solubility of calcium carbonate is inversely proportional to temperature; at higher temperatures more of it is in precipitate form and more of it will adhere to the granules or loose mesh material.

The water heater need not be housed in a tank. Only in configurations similar to FIG. 5 and FIG. 6 does the water heater need to have a space for the removal medium. When a separate unit houses the removal medium, any water heater will suffice.

Finally, a conductivity meter, or other hardness meter should monitor water hardness and the effectiveness of the removal medium in removing the precipitates that cause scale. This can be accomplished by connecting a meter, or meters, after or before and after the system, indicating the amount of precipitate removal.

Embodiments may include:

A method for removing scale from hot water by passing the hot water through a removal medium, where removal medium is defined as a bed of metal, glass, plastic or other material granules or loose mesh material with far more surface area than the walls of the tank holding the granules or loose mesh material. As hot water passes through the removal medium the precipitate comes into contact with a solid surface and adheres to it, thus removing scale from the water.

The method for treating water further covering a location for the removal medium by placing it as a layer in the water heater tank.

The method for treating water further covering a location for the removal medium by placing it in a tank receiving the hot water leaving the water heater.

The method for treating water further covering a location for the removal medium by placing it in a tank which receives the hot water leaving the water heater, where there is extra room for the expansion of the removal medium as scale accumulates on the surfaces.

The method for treating water further covering a location for the removal medium by placing it as a layer in the water heater tank, where there is extra room for the expansion of the removal medium as scale accumulates on the surfaces.

The method for treating water with the use of a circulating pump to circulate the hot water through the removal medium.

The method for treating water further covering the use of an opening in the tank containing the removal medium, whether the water heater or a separate unit, large enough to load, remove or replace granules or loose mesh material.

The method for treating water where screens made of perforated plates or plates made of metal, plastic or mineral are placed inside the tank containing the removal medium, whether the water heater or a separate unit, hold the removal medium in place.

The method for treating water further covering the use of a viewing port to inspect the condition of the removal medium without opening the tank containing the removal medium, whether the water heater or a separate unit.

The method for treating water further covering the use of a viewing port or section of transparent pipe to inspect for scale accumulation without opening the pipes.

The method for treating water further covering the use of a conductivity meter, or other hardness meter, connected after or before and after the system indicating the amount of removal of scale causing minerals.

The method for treating water wherein the tanks and pipes are insulated.

The method for treating water where the tank containing the removal medium located has an opening to allow the replacement or removal of granules or loose mesh material after scale accumulation has restricted water flow, exceeded the designated volume capacity allowed by the tank, or both.

The method for treating water further covering the use of valves that allow switching between in-use and offline units, including valves before and after some or all pumps, pipes and tanks as appropriate for maintenance and replacement. The off-line units are either backups or units to be replaced or serviced.

The method for treating water using the various configurations shown in FIG. 1 through FIG. 7.

The method for treating water further covering all combinations of FIG. 1 through FIG. 7, such as the use of multiple circulation pumps, multiple tanks and other alterations and augmentations that use ideas from other figures.

The method for treating water further covering obvious variations to the configurations depicted in FIG. 1 through FIG. 7, or combination of configurations, such as connecting additional tanks in parallel or series.

The method for treating water further covering variations to the tank containing the removal medium, such shape or material composition, as well as the use of insulation on tanks and/or pipes.

I claim:

1. An apparatus to reduce scale in hot water, the apparatus comprising:
    a hot water heater comprising a tank having a water intake and a hot water outlet, and a heater coupled with the tank;
    a housing coupled with the tank via the hot water outlet at a housing intake, wherein the housing comprises a removal medium, for removing said scale media of the removal medium being loosely positioned to pass water between the hot water outlet and a housing water outlet, the housing water outlet being adapted to couple with a hot water pipe and comprising a surface area about the removal medium that is smaller than the surface area of the removal medium, wherein the media comprises gravel, metal, or glass; and
    a circulation pump to circulate the hot water through the removal medium.

2. The apparatus of claim 1, wherein the hot water heater and the housing are insulated.

3. The apparatus of claim 1, wherein the housing is adapted to be part of the hot water heater.

4. An apparatus to reduce scale in hot water, the apparatus comprising:
    a commercial size water heater to heat water to a temperature that reduces the solubility of a precipitate associated with the scale; and
    a housing coupled with the commercial size water heater to receive a flow of the hot water and to pass the flow through a removal medium in the housing to adhere an amount of the precipitate upon contact to the removal medium;
    the removal medium comprising a number of passages to provide a commercial hot water supply to a building and a surface area that is larger than a surface area of the housing within which the removal medium resides, wherein the loose media comprises gravel, metal, or glass; and
    a circulation pump to circulate the hot water through the removal medium.

5. The apparatus of claim 4, further comprising a hardness meter coupled with an outlet of the housing to monitor the amount of precipitate removed from the heated water.

6. The apparatus of claim 4, further comprising valves to switch between the hot water heater and another hot water heater to designate an in-use hot water heater and an offline hot water heater, wherein the in-use hot water heater receives the flow and the flow is blocked from reaching the offline hot water heater.

7. The apparatus of claim 4, wherein the housing comprises more than one housings coupled in parallel or series.

8. The apparatus of claim 4, wherein the housing comprises an opening to load, remove and replace the removal medium.

9. The apparatus of claim 4, wherein the housing comprises screens to hold the removal medium in place.

10. The apparatus of claim 4, wherein the housing comprises a viewing port to inspect the precipitate on the removal medium.

11. An apparatus for creating a supply of hot water, which reduces scale in the hot water available to adhere to hot water pipes, the apparatus comprising:
    a water heater to heat a quantity of water to a temperature that reduces the solubility of a precipitate associated with the scale;
    a housing to pass a flow of the hot water from the hot water heater through loose media of a removal medium in the housing to adhere an amount of the precipitate upon contact to the removal medium;
    the removal medium having a surface area larger than a surface area of the housing and comprising a number of passages to allow the hot water to pass through the loose media, wherein the loose media comprises gravel, metal, or glass; and a circulation pump to pump the hot water to circulate the hot water through the removal medium.

12. The apparatus of claim 11, wherein the circulation pump is to re-circulate the hot water through the removal medium one or more times during an off-peak time.

13. The apparatus of claim 11, further comprising a meter to monitor hardness of the flow to determine the amount of the precipitate removed from the hot water.

14. The apparatus of claim 11, further comprising another housing coupled with the housing in parallel or series.

15. The apparatus of claim 11, further comprising a valve to switch between the housing and another housing to designate an in-use housing and an offline housing, wherein the in-use housing receives the flow while the flow is blocked from reaching the offline housing.

16. The apparatus of claim 11, wherein the housing and the hot water pipes are insulated.

17. The apparatus of claim 11, wherein the housing comprises an outlet to supply the hot water for the building.

18. A central hot water system to reduce scale in hot water to supply a building, the system comprising:

hot water pipes to supply the building with the hot water;

a water heater to supply the hot water at a temperature that reduces the solubility of a precipitate associated with the scale;

a housing coupled with the water heater to receive a flow of the hot water and to pass the flow through a removal medium in the housing to adhere an amount of the precipitate upon contact to the removal medium;

the removal medium comprising a number of passages to pass the flow through loose media of the removal medium, a surface area of the removal medium being larger than a surface area of the housing, wherein the loose media comprises gravel, metal, or glass; and a circulation pump to circulate the hot water through the removal medium to adhere a further amount of the precipitate to the removal medium.

19. The system of claim 18, wherein the hot water pipes comprise a transparent portion to inspect for scale accumulation.

20. The system of claim 18, wherein the housing is a tank to receive the hot water that flows from the water heater.

* * * * *